(12) United States Patent
    Auer

(10) Patent No.: US 10,271,516 B2
(45) Date of Patent: Apr. 30, 2019

(54) ANIMAL EARMARK WHICH COMPRISES AN ELECTRIC BATTERY

(71) Applicant: SMARTBOW GMBH, Weibern (AT)

(72) Inventor: Wolfgang Auer, Weibern (AT)

(73) Assignee: SMARTBOW GMBH, Weibern (AT)

( * ) Notice: Subject to any disclaimer, the term of this patent is extended or adjusted under 35 U.S.C. 154(b) by 0 days.

(21) Appl. No.: 15/567,194

(22) PCT Filed: Apr. 29, 2016

(86) PCT No.: PCT/AT2016/000047
§ 371 (c)(1),
(2) Date: Oct. 17, 2017

(87) PCT Pub. No.: WO2016/172744
PCT Pub. Date: Nov. 3, 2016

(65) Prior Publication Data
US 2018/0098521 A1    Apr. 12, 2018

(30) Foreign Application Priority Data

Apr. 30, 2015 (AT) .................................. A262/2015

(51) Int. Cl.
*A01K 11/00* (2006.01)
*G06K 19/077* (2006.01)

(52) U.S. Cl.
CPC .......... *A01K 11/004* (2013.01); *A01K 11/006* (2013.01); *G06K 19/077* (2013.01)

(58) Field of Classification Search
CPC ............................ A01K 11/004; A01K 11/006
See application file for complete search history.

(56) References Cited

U.S. PATENT DOCUMENTS

| 5,501,916 | A  | * | 3/1996 | Teramoto | H01M 2/20 |
| | | | | | 429/120 |
| 7,685,752 | B2 | * | 3/2010 | Robadey | A01K 11/001 |
| | | | | | 119/721 |
| 7,726,055 | B2 | * | 6/2010 | Costantini | A01K 11/004 |
| | | | | | 24/704.1 |
| 2007/0006494 | A1 | * | 1/2007 | Hayes | A01K 11/001 |
| | | | | | 40/301 |

(Continued)

FOREIGN PATENT DOCUMENTS

| AT | 509892 B1 | 6/2014 |
| CN | 102166057 A | 8/2011 |

(Continued)

OTHER PUBLICATIONS

International Search Report (in English and German) issued in PCT/AT2016/000047, dated Aug. 3, 2016, ISA/EPO, Rijswijk.

(Continued)

*Primary Examiner* — Gary C Hoge
(74) *Attorney, Agent, or Firm* — Harness, Dickey & Pierce, P.L.C.

(57) ABSTRACT

The disclosure relates to an animal earmark which comprises an electric battery. The outer shape of the battery is that of a circular ring. According to a particularly advantageous embodiment, the animal earmark has a mandrel designed to extend through a through-opening in the outer ear of an animal and to also project into the space enclosed by the circular ring which is defined by the battery.

15 Claims, 4 Drawing Sheets

(56) References Cited

U.S. PATENT DOCUMENTS

Figure 1:
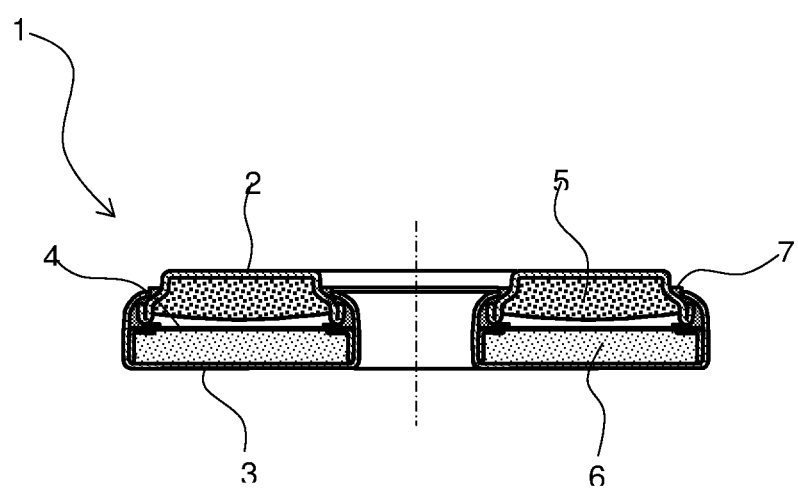

| | | |
|---|---|---|
| 2009/0094869 A1 | 4/2009 | Geissler et al. |
| 2018/0020641 A1* | 1/2018 | Holman ................. A01K 19/00 |

FOREIGN PATENT DOCUMENTS

| | | |
|---|---|---|
| EP | 2214474 A1 | 8/2010 |
| JP | 2014180217 A | 9/2014 |

OTHER PUBLICATIONS

Written Opinion (in German) of the International Searching Authority issued in PCT/AT2016/000047, dated Aug. 3, 2016, ISA/EPO, Rijswijk.

* cited by examiner

ANIMAL EARMARK WHICH COMPRISES AN ELECTRIC BATTERY

CROSS-REFERENCE TO RELATED APPLICATIONS

This application is a 371 U.S. National Stage of International Application No. PCT/AT2016/000047, filed Apr. 29, 2016, which claims the benefit of and priority to Austrian Patent Application No. A262/2015, filed Apr. 30, 2015. The entire disclosures of the above applications are incorporated herein by reference.

The invention relates to an animal ear tag which comprises an electric battery.

Within the meaning of this document, the word "battery" always means an electric battery irrespective of whether the latter can only be discharged once or can be repeatedly charged up and discharged.

Batteries are used for supplying energy especially to transportable electric devices which are independent of the electric energy supply grid. They have to be compact, usable irrespective of position, lightweight and nevertheless mechanically robust. They must neither leak nor exhale gas during normal storage. With regard to the electrochemically active components and the geometrical shapes and sizes, a multiplicity of embodiments have been standardized, are known and are commercially available. Typical outer shapes are elongate or disk-shaped circular cylinders, right-angled prisms and prisms with a pair of opposite elongate side surfaces which are curved outward. During the selection of a specific battery for a specific use, the criteria "quantity of energy to be stored", "output electric voltage" and "space" are generally the most important.

A battery is also used in active ear tags for animals. Active ear tags in this sense are those which, within the scope of an included electronic circuit, have functions, such as, for example, measuring of conditions and radio transmission of the results, which require so much energy that a dedicated energy accumulator is required for this purpose.

AT 509 892 B1 describes an active ear tag. It is proposed here to configure the ear tag, which is equipped with a battery, in such a manner that the center of gravity of the ear tag lies in the axis of that spike which, for the purpose of fastening the ear tag to an outer ear of an animals, runs through a passage hole pierced for this purpose, in the outer ear. The batteries outlined in this regard in AT 509 892 B1 are in the form of circular disks or circular cylinders. Since the center of gravity lies in the spike axis, the ear tag advantageously does not tend to oscillate. It is disadvantageous that the arrangement of the battery in the housing of the ear tag leads to the external dimensions of the ear tag becoming fairly large, in particular in the direction parallel to the spike axis. This size leads to the ear tag becoming caught somewhere when the animal moves or that other animals bite around it.

Starting from this prior art, the object on which the invention is based consists in configuring an animal ear tag, which comprises electronics, a battery and a housing surrounding the two, such that, even if a relatively large battery has to be used, the animal ear tag, as seen from the outside, can be as flat as possible and approximately in the shape of a circular disk.

To achieve the object, it is proposed to design the battery in the form of a circular ring.

The circular ring can be designed to be annularly closed per se or else also to be open.

By the battery being designed in the shape of a circular ring, it can be designed to be wider and flatter in relation to other batteries with the same storage capacity and provides space in the encircled volume region for circuit elements or fastening elements.

When circuit parts are encircled by the battery, said circuit parts are readily protected both mechanically and thermally, and also are particularly readily shielded with respect to electromagnetic radiation by the battery.

In an animal ear tag, the encircled volume region is advantageously usable for anchoring the tip of that spike which connects the parts of the animal ear tag that are located on both sides of the outer ear to each other. The animal ear tag can therefore also be simply configured in such a manner that it is shaped coaxially with respect to the axis of the spike, and the center of gravity of the entire animal ear tag lies in the axis of the spike or very close thereto.

When the battery is dimensioned to such an extent that a single battery charge suffices for the entire duration of the animal ear tag being worn, an advantageously small, flat and also well-balanced design of the animal ear tag can nevertheless therefore be realized for the first time. A saving on costs and a significant improvement in reliability are obtained if the battery does not need to be exchanged for the entire period of an animal wearing the animal ear tag.

The functioning of the electrochemically active components and the alignment thereof with respect to one another can be precisely the same in batteries according to the invention as in batteries according to the prior art.

Figure 2:
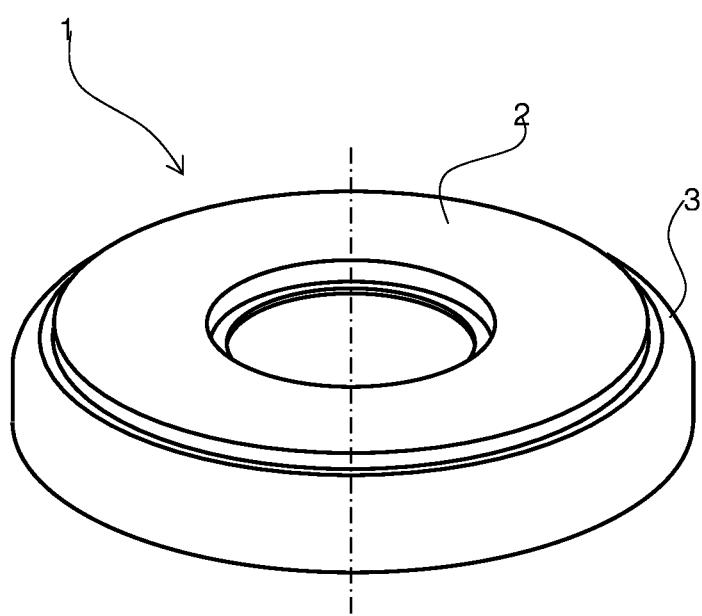

The invention is illustrated with reference to drawings for exemplary embodiments:

FIG. 1: shows an exemplary battery which can be used in an animal ear tag according to the invention, FIG. 2: shows the battery from FIG. 1 in a perspective illustration.

Figure 3:
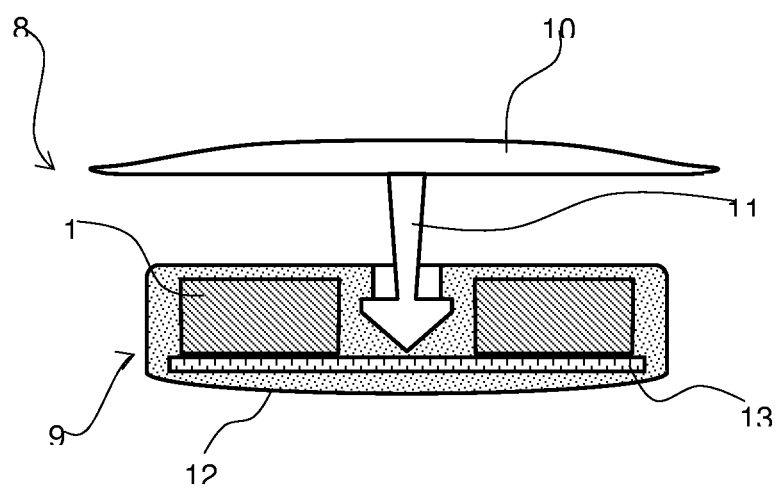

FIG. 3: shows, in a partial sectional view, a first exemplary animal ear tag designed according to the invention.

Figure 4:
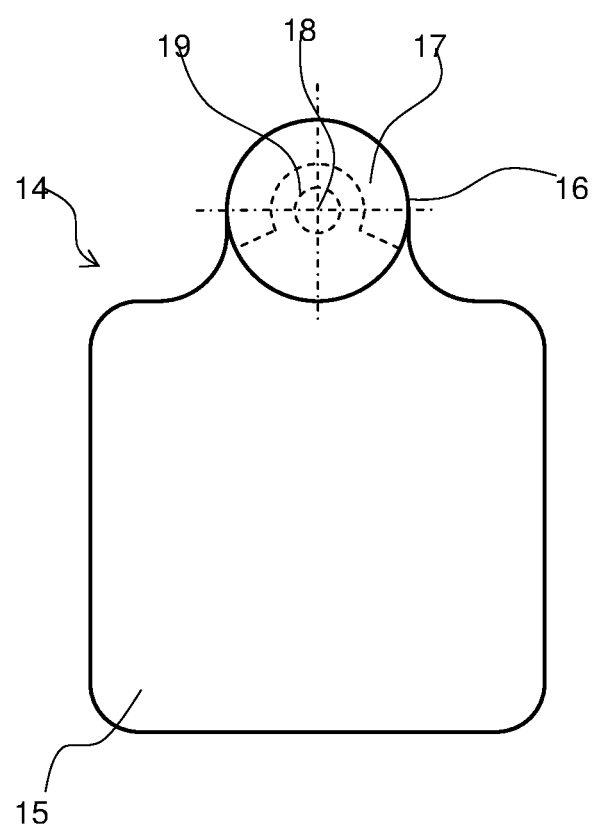

FIG. 4: shows, in a frontal view, a second exemplary animal ear tag designed according to the invention.

The exemplary battery 1 from FIG. 1 has, on the outside, an annular cell cover 2, which forms the negative pole, and also an annular housing 3, which forms the positive pole. The anode 5, the cathode 6 and a separating layer 4 lying in between are located in the interior. The anode 5 can be composed, for example, of zinc powder in gel; the cathode 6, for example of mercury oxide.

Located between the negative and positive pole, that is to say between cell cover 2 and housing 3, is a sealing ring 7 which also prevents electric contact between the two poles.

The closed circular ring shape of the battery 1 can be directly seen in FIG. 2.

The animal ear tag 8 according to the invention of FIG. 3 comprises an active part 9 and a counter plate 10, with which a spike 11 is monolithically formed. When the animal ear tag 8 is fitted, the active part 9 lies against one side of the outer ear (not illustrated) of the animal, and the counter plate 10 lies on the other side. The spike 11 connects the two parts to each other and, for this purpose, runs through a passage opening in the outer ear of the animal.

The active part 9 comprises a housing 12 and the parts which are arranged therein—the battery 1 and electronic circuit 13.

In the example outlined in FIG. 3, the electronic circuit 13 is arranged on one end side of the battery 1. When the animal ear tag 8 is fitted, the tip of the spike 11 projects into the volume encircled by the battery 1 and is hooked there in an opening of the housing 12. It can be immediately seen that, even when a very large and therefore long-lasting battery 1 is used, a flat and well-balanced design of the animal ear tag 8 is therefore achieved.

It is also readily apparent from FIG. 3 that the battery 1 can also mechanically support the circuit 13.

The animal ear tag 14 according to the invention from FIG. 4 consists of a badge part 15 with a relatively large surface and an active part 16 which has a smaller surface than said badge part.

The badge part 15 is customarily provided with a widely visible, individual identifying label.

The active part 16 comprises, in a housing, an active electronic circuit (not illustrated) and a battery 17 which, in this case, is designed as an open circular ring about the axis 18. The spike 19 which forms the connection running through the outer ear to a counter plate (not illustrated) runs coaxially with respect to the circular ring formed by the battery 17.

The badge part 15 and the battery 17 lie precisely opposite with respect to the axis 18. It can therefore be readily achievable that, although the center of gravity of the entire animal ear tag 14 in the plane lying normally to the axis 18 lies on the same side as the badge part 15, it is only at a very small distance from the axis 18. The effect achieved by this is that the animal ear tag hangs in a well defined manner on the animal ear, but does not swing when the animal moves.

As outlined in FIG. 4, it is advantageous that the angle by which the open circular ring, which the battery 17 constitutes, extends through at least 180°. The advantages, which are mentioned further above, of a battery, which is in the shape of a circular ring, in respect of the mechanical protective and supporting effect for an electronic circuit and also the electromagnetic shielding effect can therefore be readily achieved even in the case of an open ring shape.

The invention claimed is:

1. An animal ear tag which comprises an electric battery, wherein the battery is substantially ring shaped including a ring shaped body having an opening there through; and
    a spike which, when the animal ear tag is correctly attached to an animal, runs through a passage opening in an outer ear of the animal and projects into the opening of said battery.

2. The animal ear tag as claimed in claim 1, wherein the ring shaped body is open and extends by more than 180° around its ring axis.

3. The animal ear tag as claimed in claim 1, wherein the spike lies coaxially with the axis of the ring shaped body.

4. The animal ear tag as claimed in claim 1, wherein it comprises an electronic circuit which is substantially arranged on a flat surface which is oriented normally to the axis of the ring shaped body of the battery.

5. The animal ear tag as claimed in claim 4, wherein the circuit is located on an end side of the ring shaped body of the battery.

6. The animal ear tag as claimed in claim 4, wherein the electronic circuit is located within the volume which is encircled by the ring shaped body of the battery.

7. The animal ear tag as claimed in claim 1, wherein it comprises a sheet-like, substantially flat badge part and an active part which has a smaller surface than said badge part and which contains the battery and an electronic circuit, wherein the axis of the ring shaped body of the battery is oriented normally to the surface of the badge part.

8. The animal ear tag as claimed in claim 7, wherein the ring shaped body of the battery is open, and its open circumferential side is oriented toward the badge part.

9. An animal ear tag which comprises:
    an electric battery, wherein the battery is substantially ring shaped including a ring shaped body having an opening there through;
    an electronic circuit which is substantially arranged on a flat surface which is oriented normally to the axis of the ring shaped body of the battery; and
    wherein the electronic circuit is located within the volume which is encircled by the ring shaped body of the battery.

10. The animal ear tag as claimed in claim 9, wherein the ring shaped body is open and extends by more than 180° around its ring axis.

11. The animal ear tag as claimed in claim 9 further comprising:
    a spike which, when the animal ear tag is correctly attached to an animal, runs through a passage opening in an outer ear of the animal and projects into the opening of said battery.

12. The animal ear tag as claimed in claim 9, wherein the spike lies coaxially with the axis of the ring shaped body.

13. The animal ear tag as claimed in claim 9, wherein the circuit is located on an end side of the ring shaped body of the battery.

14. The animal ear tag as claimed in claim 9, wherein it comprises a sheet-like, substantially flat badge part and an active part which has a smaller surface than said badge part and which contains the battery and an electronic circuit, wherein the axis of the ring shaped body of the battery is oriented normally to the surface of the badge part.

15. The animal ear tag as claimed in claim 14, wherein the ring shaped body of the battery is open, and its open circumferential side is oriented toward the badge part.

* * * * *